United States Patent [19]
Maeda

[11] Patent Number: 5,052,536
[45] Date of Patent: Oct. 1, 1991

[54] CLUTCH FACING
[75] Inventor: Shigeho Maeda, Osaka, Japan
[73] Assignee: Kabushiki Kaisha Daikin Seisakusho, Osaka, Japan
[21] Appl. No.: 457,780
[22] PCT Filed: May 12, 1989
[86] PCT No.: PCT/JP89/00489
 § 371 Date: Jan. 11, 1990
 § 102(e) Date: Jan. 11, 1990
[87] PCT Pub. No.: WO89/12181
 PCT Pub. Date: Dec. 14, 1989
[30] Foreign Application Priority Data
 Jun. 3, 1988 [JP] Japan .............................. 63-74478[U]
[51] Int. Cl.$^5$ ...................... F16D 13/64; F16D 69/02; F16D 69/04
[52] U.S. Cl. .............. 192/107 M; 192/107 R
[58] Field of Search .............. 192/107 R, 107 M; 188/218 XL

[56] References Cited
U.S. PATENT DOCUMENTS
2,054,210 9/1936 Weisenburg .................. 192/107 R
3,037,860 6/1962 Masterson et al. ............ 192/107 M
4,416,361 11/1983 Suzuki et al. ................. 192/107 M
4,593,070 6/1986 Oyama et al. ................. 192/107 M
4,657,951 4/1987 Takarada et al. ............. 192/107 M FOREIGN PATENT DOCUMENTS
49960 11/1978 Japan .
80531 7/1981 Japan .
167921 12/1981 Japan .
46231 3/1983 Japan .
155636 9/1984 Japan .
151419 8/1985 Japan .
0041022 2/1986 Japan ............................ 192/107 M
288728 12/1987 Japan .

Primary Examiner—Rodney H. Bonck
Attorney, Agent, or Firm—Armstrong, Nikaido, Marmelstein, Kubovcik & Murray

[57] ABSTRACT

A clutch facing (1) having an annular friction material (3) and reinforcing plate (4) integrally connected to the friction material (3) characterized by that the reinforcing plate (4) having substantially the same shrinkage as the friction material has, an annular rib (6) concentrically formed on the connecting surface (5) of the reinforcing plate (4), and radial ribs (7) formed on the connecting surface (5) and crossing the annular rib (6).

13 Claims, 1 Drawing Sheet

006
CLUTCH FACING

DESCRIPTION

1. Technical Field

This invention relates to a clutch facing, e.g., used for a friction clutch of a vehicle, or the like.

2. Background Art

A conventional clutch facing of a clutch disc is generally produced by impregnating phenolic resin as a binding agent to non woven fabric such as asbestos or the like and by heating and pressing it. However, such conventional arrangement has the disadvantage that the clutch facing may not have enough durability to prevent a friction material from peeling or breaking away caused by circumferential burst force strongly applied on a friction surface during an operation.

To solve such problem, another arrangement as shown in FIG. 3 is also known. In the arrangement, a surface of a friction material 31 has bonded thereto an annular reinforcing plate 32 made of metal. However, in the foregoing arrangement, the reinforcing plate 32 must have sufficient thickness to prevent the friction material 31 from deforming, so that inertia torque applied on the clutch facing become too large. This causes the disadvantage that the shift operation of the transmission can not be carried out effectively.

To prevent such disadvantage, a further arrangement as shown in FIGS. 4 and 5 is also proposed in the Japanese Unexamined Patent Publication No. 61-70224. In the arrangement, an annular friction material 35 is integrally connected to a backup member 34. The backup member 34 has two pieces with an annular light metal net 33 molded concentrically therebetween. Each piece of the backup member 34 is produced by adding elastic materials e.g. rubber to a chopped stranded mat made of glass fiber inpregnated phenolic resin.

However, in such arrangement, shrinkage of the friction material 35 differs from that of the backup member 34, so that differential shrinkage of the friction material 35 during the forming process causes deformation as shown by two dot line W of FIG. 5. Thus, the friction coefficient of the clutch facing at initial stage of use may be too low to engage the clutch.

Although the arrangement in FIGS. 4 and 5 has a connecting surface 36 on which is concentrically formed an annular rib 37, the rib 37 does not work very well as a reinforcing member which prevents the circumferential burst force applied on the friction surface.

Accordingly it is an object of the present invention to provide an improved clutch facing, overcoming the above mentioned disadvantage by preventing the growth of inertia and deformation of the clutch facing, in which a reinforcing member is connected to an opposite side of a friction surface.

DISCLOSURE OF THE INVENTION

In order to accomplish the above object, the present invention employs a clutch facing having an annular friction material. A reinforcing plate is integrally connected to the friction material, the reinforcing plate has substantially the same shrinkage as the friction material has. The reinforcing plate has a connecting surface on which are integrally formed an annular rib and radial ribs which cross the annular rib.

Selected shrinkage of the reinforcing plate and the annular and radial ribs prevent the friction material from deforming even in the producing situation.

BEST MODE FOR CARRYING OUT THE INVENTION

Figure 1:
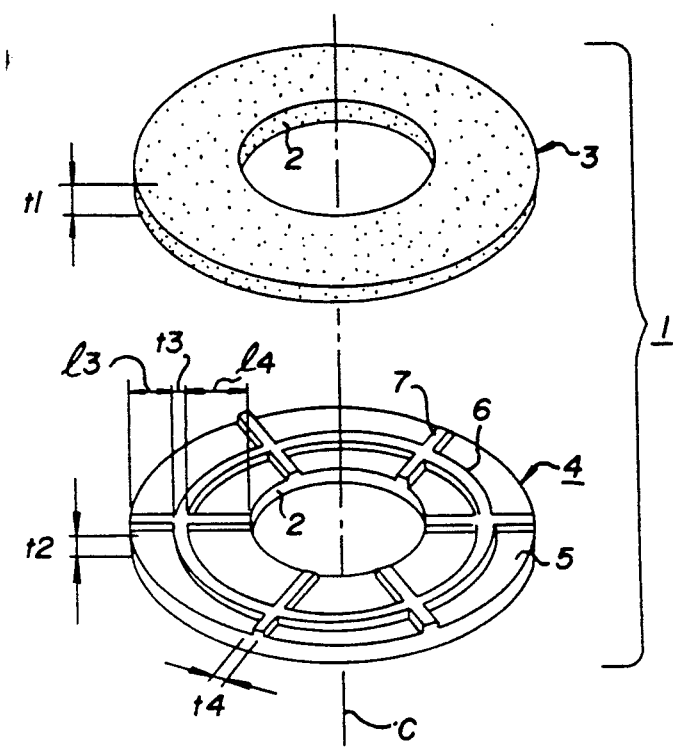
FIG. 1 is a perspective exploded view of a clutch facing of the present invention.

As shown in FIG. 1, an annular clutch facing 1 consists of a friction material 3 and a reinforce plate 4 which have, respectively, formed therein a central large diameter hole 2. The friction material 3 is produced e.g. by impregnating phenolic resin or the like to non woven fabric such as asbestos or glass fiber.

Reinforcing plate 4 may be formed of a material from the group consisting of a light metal such as aluminum or aluminum alloy, a material which has strong tensile strengh such as glass fiber including copper wire, or a high molecular density compound which has high shrinkage ratio such as phenolic resin, polybutadiene, or polyamide, or the like. The reinforcing plate 4 material is selected to have substantially the same shrinkage during the forming process as the friction material 3 has. Thus, the deformation of the friction material 3 during the forming process can be prevented because the reinforcing plate 4 will shrink by the same quantity as the friction material 3. A difference or error of the shrinkage can be accepted if the friction coefficient under the initial stage of use is not excessively low.

The total thickness of the clutch facing 1 can also be thin by employing the foregoing materials to set to the thickness t2 of the reinforce plate 4 thinner than the thickness t1 of the friction material 3.

The reinforcing plate 4 has a connecting surface 5 which abuts and is connected to the friction material 3. The connecting surface 5 has concentrically formed thereon an annular thin rib 6. In the embodiment, a radial distance 13 from an outer periphery of the connecting surface 5 to the annular rib 6 is shorter than a radial distance 14 from an inner periphery of the connecting surface 5 to the annular rib 6, thereby durability against the circumferential burst force at the outer periphery of the clutch facing 1 on which is applied inertia torque is improved. The connecting surface 5 of the reinforce plate 4 has formed thereon radial ribs 7 provided with 60° spacings therebetween in the circumferential direction. Radial ribs 7 cross the annular rib 6. The thickness t4 of each radial rib 7 is substantially the same as the thickness t3 of the annular rib 6.

The ribs 6 and 7 prevent the deformation of the clutch facing 1 which is occured by manufacturing heat of heat treatment or by friction heat of operation. Because the radial ribs 7 cross the annular rib 6, the durability of the friction facing 1 can be maintained even if the strong burst force is applied in the circumferential direction.

Figure 2:
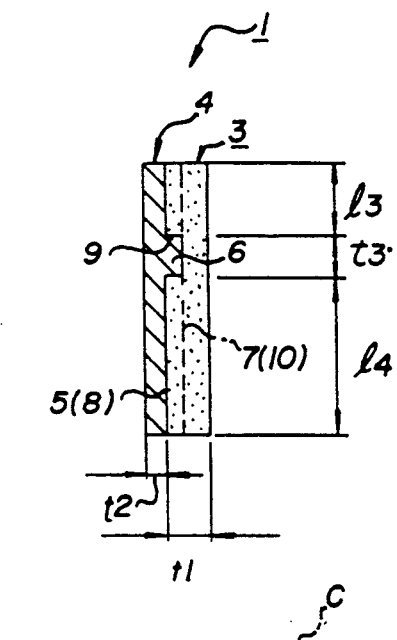
FIG. 2 is a partial cross sectional view of a clutch facing of the invention.
Figure 3:
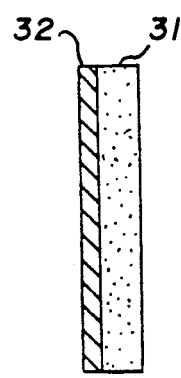
FIG. 3 is a partial cross sectional view of a clutch facing of the conventional arrangement.
Figure 4:
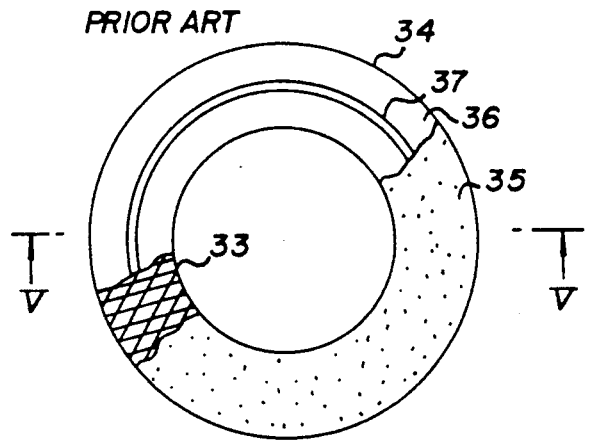
FIG. 4 is a plain view of another conventional arrangement.
Figure 5:
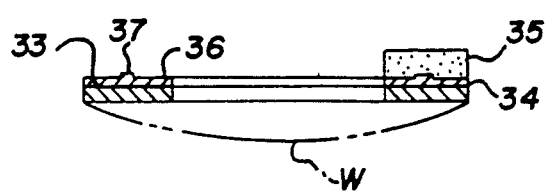
FIG. 5 a sectional view taken along line of V—V of FIG. 4.

As shown in FIG. 2, the reinforcing plate 4 is integrally the like.

In the case that the reinforcing plate 4 is bonded to the friction material 3, grooves 9 and 10 aligning with the ribs 6 and 7 are first formed in the friction material 3. Secondary, adhesive agent is applied to the connecting surface 5 and the grooves 9 and 10, and then the connecting surface 5 of the reinforcing plate 4 is abutted upon the connecting surface 8 of the friction plate 3 so that the ribs 6 and 7 are respectively fit in the grooves 9 and 10.

According to the foregoing arrangement, because the reinforcing plate 4 has substantially the same shrinkage as the friction material 3 has, and the radial ribs 7 crossing the annular rib 6 are formed on the connecting surface 5 of the reinforce plate 4, the friction material 3 is prevented from deforming. Thus, the friction coefficient of the clutch facing 1 at initial stage of use can be maintained at high value. Furthermore, because the radial ribs 7 crossing the annular rib 6 are formed on the connecting surface 5 of the reinforcing plate 4, durability against the circumferential burst force applied on the clutch facing 1 is sufficiently improved.

Particularly, in the foregoing embodiment, the radial distance 13 from the outer periphery of the connecting surface 5 to the annular rib 6 is shorter than the radial distance 14 from the inner periphery of the connecting surface 5 to the annular rib 6, so that durability against the circumferential burst force at the outer periphery of the clutch facing 1 on which is applied inertia torque, is also sufficiently improved. Furthermore, because the reinforcing plate 4 is any one of a light metal such as aluminum or aluminum alloy, a material which has strong tensile strengh such as glass fiber including copper wire, or a high molecular density compound which has high shrinkage ratio such as phenolic resin, polybutadiene, or polyamide, or the like, thickness t2 of the reinforcing plate 4 can be thinner than the thickness t1 of the friction material 3, thereby the clutch facing 1 may be light and inertia torque is reduced.

According to the present invention as discribed above, the deformation of the clutch facing 1 is prevented because the reinforcing plate 4 has substantially the same shrinkage as the friction material 3 has, and the radial ribs 7 crossing the annular rib 6 are formed on the connecting surface 5. Thus, the friction coefficient at initial stage of use is not excessively low. Accuracy and durability are also improved. Furthermore, the radial ribs 7 cross the annular rib 6, so that durability against circumferential burst force applied on the clutch facing 1 is sufficiently improved.

An outer surface of the ribs 6 and 7 increases connecting area, so that the connecting force of plates 3 and 4 is also increased.

Industrial Applicability

This invention is applicable to a passenger car, industrial construction vehicle, or the like.

I claim:

1. A clutch facing comprising:
   an annular friction facing of friction material;
   an annular reinforcing plate integrally connected at a connecting surface to said friction material at a side opposite to a friction face of said friction material;
   wherein said reinforcing plate is formed of a material having substantially the same shrinkage as that of said annular friction material, caused by heat treatment during manufacturing of said clutch facing and friction heating thereof during operation, and
   said reinforcing plate having an annular rib formed concentrically on said connecting surface and having radial ribs formed on said connecting surface crossing said annular rib.

2. A clutch facing as set forth in claim 1, wherein said friction material is formed of asbestos impregnated with phenolic resin.

3. A clutch facing as set forth in claim 1, wherein said friction material is formed of glass fiber impregnated with phenolic resin.

4. A clutch facing as set forth in claim 1, wherein said reinforcing plate is made of light metal.

5. A clutch facing as set forth in claim 4, wherein said light metal is aluminum or aluminum alloy.

6. A clutch facing as set forth in claim 1, wherein said reinforcing plate is made of glass fiber including copper wire.

7. A clutch facing as set forth in claim 1, wherein said reinforcing plate is made of a high molecular density compound.

8. A clutch facing as set forth in claim 7, wherein said high molecular density compound is phenolic resin or polyamide or polybutadiene.

9. A clutch facing as set forth in claim 1, wherein a radial direction from the outer periphery of said connecting surface to said annular rib is shorter than a radial direction from the inner periphery of said connecting surface to said annular rib.

10. A clutch facing as set forth in claim 1, wherein said radial ribs have substantially the same thickness as said annular rib.

11. A clutch facing as set forth in claim 1, wherein said connecting surface of said friction material has grooves aligning with said radial and annular ribs.

12. A clutch facing as set forth in claim 1, wherein said friction material and said reinforcing plate are connected to each other by bonding.

13. A clutch facing as set forth in claim 1, wherein said friction material and said reinforcing plate are connected to each other by molding.

* * * * *